May 19, 1953     A. M. THOMSEN     2,639,220
METHOD OF MAKING COPPER SULFATE
Filed Oct. 4, 1951
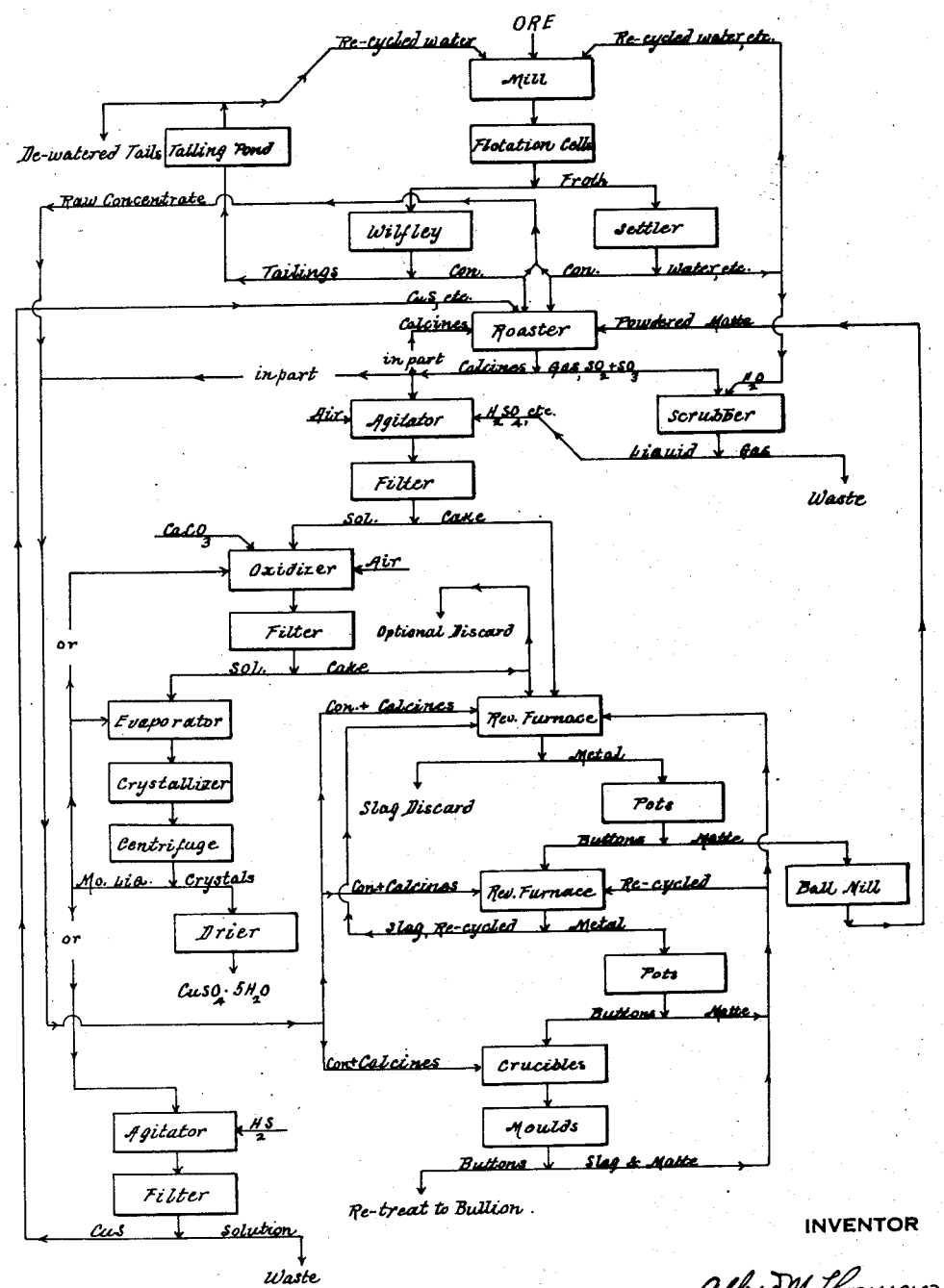
INVENTOR
Alfred M Thomsen

Patented May 19, 1953

2,639,220

UNITED STATES PATENT OFFICE 2,639,220

METHOD OF MAKING COPPER SULFATE

Alfred M. Thomsen, San Francisco, Calif.

Application October 4, 1951, Serial No. 249,741

6 Claims. (Cl. 23—125)

The object of my invention is to produce copper sulphate directly from an ore as a principal product both the sulphur and the copper components of said copper sulphate being derived from the ore itself. Not all ores of copper are suitable for my purpose and my process presupposes such an ore as the starting point. In general, an ore having its copper in the form of sulphide with some additional iron sulphide, either in the mineral itself or admixed with same, with a somewhat silicious gangue constitutes an ideal ore. Such ores are not uncommon and if a considerable part of the value of such ores be in precious metals as well then the economics are even better.

There is no better way of describing my process than to follow the steps indicated on the flow sheet, the drawing attached hereto. The first steps are conventional milling practice consisting of grinding followed by concentration of the metallic portion of the ore, the silicious gangue being essentially eliminated. Two methods are shown, flotation for the fines and tabling for the coarser portion with recirculation of the water employed in said milling steps. It is not the aim to produce a clean metallic concentrate but rather to leave a part of the gangue, as middlings, in the concentrate in sufficient amount so that the retained silica therein will be available to slag the iron, also present in the mineral portion, when smelting is introduced.

The first chemical step introduced is roasting which may be conventional or with the added step that a portion of the calcines are re-cycled. Such a recycling to the extent that the feed to the furnace consists one-half of raw concentrates and one-half of calcines has many advantages if the aim is to produce copper sulphate instead of merely to eliminate surplus sulphur for a successive smelting step. I am, therefore, showing it as an essential part of my process.

By such re-cycling the temperature within the furnace can be kept lower and sintering completely avoided. The lower temperature and its better control result in a much larger ratio of copper sulphate in the charge that would otherwise be obtained. In addition, the liberation of the $SO_2$ in the roasting step takes place in the presence of much iron oxide, previously formed, and thus a great deal of said $SO_2$ becomes transformed into $SO_3$, a most important consideration in view of the need of such material in putting the insoluble basic copper compounds formed during roasting into solution in water.

I have, therefore, shown the gases leaving the roaster scrubbed with water so as to recover this $SO_3$ in the form of sulphuric acid. Simultaneously such washing of the gas results in the thorough recovery of dust which may, at times, amount to as much as 5% of the total charge. The scrubbing medium is then used as the fluid commingled in the "agitator" with the calcines issuing from the roasting step, making total recovery possible.

The calcines contain not merely copper in the form of sulphate but also much iron due to the low temperature of the roast which is kept at a low visible red. The sulphuric acid recovered from the roaster gas aids in dissolving basic sulphates of both copper and iron as well as the normally water-soluble sulphates.

In the drawing I have shown the magma within the agitator subjected to the action of air. A Pachuca tank is, therefore, an ideal device for such combined agitation and aeration. By such procedure the ferrous compounds are oxidized to the ferric state and thus add their solvent power to the sulphuric acid previously mentioned. The acid menstruum resulting from the joint action of air and acid is next filtered and the solids passed on to the smelting stage of my process.

The solution is now fully oxidized with more air and the iron content precipitated by the addition of calcium carbonate. I have shown this as a separate step but it is obvious that it could be combined with the preceding step if same were put on a batch and not on a continuous basis. In that event, however, the calcium sulphate produced in the later reaction would become commingled with the residual ore and would be added to the furnace charge. On the drawing I have shown the optional discard of a portion of such calcium sulphate as this may be demanded by the slag forming constituents of said ore residual. Manifestly, it would become possible to add so much lime at this stage that the slag would become viscous or otherwise unsuitable for smelting.

With a suitable ore, the filtrate from the oxidizing and precipitating step is now a rather pure solution of copper sulphate, it can thus be evaporated, crystallized, and centrifuged in purely orthodox practice so nothing need be said on that subject. However, as there are impurities in said solution, the mother liquor flowing from the centrifuge requires some consideration otherwise said impurities would soon collect to such an extent that the copper sulphate would become contaminated thereby. A portion of said liquor is thus shown recycled to the oxidizing step to undergo once more the previous type of purification. Another portion is treated with H₂S, the precipitate recycled and the residual solution discarded.

By this double method of purification almost all of the common metals that could be present and thus accumulate to a disturbing degree in the mother liquor are periodically removed and a high purity of copper sulphate assured. Manifestly, any soluble sulphide could be substituted for the H₂S if the mother liquor were first acidified. The regeneration of acid by using the hydrogen compound renders such acidification unnecessary.

What might be considered a blemish on the process as so far disclosed is the use of calcium carbonate to neutralize excess acid and to precipitate the metals in the iron group. A decided improvement is made if a basic copper compound such as a hydroxide or carbonate were substituted for said lime. For this reason it would be highly advantageous to work a portion of the ore by the process described in another patent which has for its aim the production of copper in such a basic form instead of as the sulphate. According to this patent copper is obtained either as the hydroxide or the sulphide from ores that could not be directly used in the herein described manner for the production of copper sulphate.

If said patent, No. 2,111,951, entitled "Hydro-Metallurgy" and issued March 22, 1938, be combined with the operation of the instant disclosure an extremely economic operation will result. Inasmuch as the drawing shows the recycling of a copper sulphide produced in the mother liquor purification, it is obvious that copper sulphide, produced in accordance with No. 2,111,951, can be introduced to any extent at this point. Precious metals, present in said copper sulphide will in either case be recovered at the smelting step. The use of the copper precipitate from claim 1, in said patent, has already been duly noted and is obvious.

So far only broad generalities have been used in describing my process for making copper sulphate. The unknown factor in each and every case is the actual ore selected for the operation. Owing to the extreme diversity of such ores all minor details must be obtained by empirical observation and practice. Such details are: the particle size needed for proper roasting, the actual temperature of the roast, the strength of solution in leaching the calcines, the time function need in all such operations, etc.

While the aim and object of all such adjustments is to obtain a maximum of soluble copper extracted from the ore, this desirable objective is circumscribed by sundry difficulties. In order to preserve sulphates in the roast an undue amount of iron must also go into solution. If the temperature be raised to render such iron insoluble then the solubility of the copper is likewise influenced thereby. For this reason it is not desired to attempt to extract more than 80% of the total copper from the calcines, permitting the rest to be recovered in smelting with subsequent re-cycling, which brings up the smelting stage of the process.

In the drawing I have shown a reverberatory furnace as the smelting device. A blast furnace would serve, but the fineness of the charge as well as the desire to make both matte and a certain amount of bullion copper all indicate the reverberatory as the more suitable device for smelting. The charge consists of the leached calcines supplemented with some calcium sulphate, or, if needed, some ordinary limestone. On fusion, the gangue of the ore, supplemented by released iron and additive lime produce the slag. It is desirable that the sulphur be so proportioned that a matte-fall of 20% be obtained, counting the weight of bullion as a part of the matte-fall. If the charge be deficient in sulphur correction is easily made by adding a little raw concentrates.

Similarly, it is desirable to have the bullion copper representing approximately one third of the matte in order that substantially all of the gold and most of the silver resident in the ore be concentrated in the copper bullion. In the drawing, this matte is shown passing through a ball mill and then commingled with the mixed raw and roasted ore which constitutes the roaster feed. Powdered matte is rather difficult to roast by itself, but as an ingredient in the mixture of raw and roasted material passing through an orthodox roasting device no trouble will be experienced. From a well conducted smelting operation the slag should be so low as to discard it.

It is thus seen that the precious metal content of the ore, due to such recycling of the matte after a copper "bottom" has been obtained, appears in the "bottoms" which will ultimately contain all the gold and silver originally resident in said ore. As a means of making a further separation between the copper, which is wanted for sulphate manufacture, and the contained precious metals I have availed myself of the old technique known as "stripping" wherein such copper bullion is remelted with fresh sulphides and/or roasted sulphides to produce an even richer "bottom" than before and a matte and slag which are both recycled to the former smelting step, being too rich in precious metals to be used directly for sulphate making for fear of losses.

By the practice of my process it thus becomes possible to obtain substantially all the resident copper of the ore in the form of copper sulphate while the precious metal content of said ore is likewise obtained in a bullion form sufficiently rich to be sold directly to the mint. While some of the steps, such as small scale reverberatory smelting and "stripping" are considered rather archaic in the light of today's universal supremacy of electrolytic copper refining, I believe that as herein applied they constitute a very efficient step in making copper sulphate.

I have also attempted to show that while ore dressing, roasting, leaching, smelting, stripping, etc. are independent operations, yet in order to obtain the results I seek I must apply them all in substantially the manner herein indicated.

Having thus fully described my process, I claim:

1. The method of making copper sulphate from a sulphide copper ore which comprises; dressing said ore to obtain a concentrate in which more iron shall be present than copper with silica approximately the same as the iron; commingling said concentrate with powdered matte, obtained at a later step in the process, and with a previously roasted part of said mixture; roasting said mixture of raw and roasted material under a low red heat to obtain maximum formation of sulphates, the gases from said operation being scrubbed with water to extract their sulphuric acid content; recycling a portion of the calcines thus obtained and leaching the remainder with the scrubbing medium previously described; smelting the insoluble residue from said leaching to obtain slag, matte and copper bullion; recycling the matte as previously described; aerating the copper sulphate solution previously obtained in the leaching step and precipitating the resident ferric iron by means of a basic calcium compound; evaporating and crystallizing the purified copper sulphate solution thus obtained and separating the crystallized bluestone from the mother liquor.

2. The method of making copper sulphate set forth in claim 1, with the added step that solution of basic sulphates in the leaching step be promoted by aeration of the agitated magma.

3. The method of making copper sulphate set forth in claim 1, with the added step that a portion of the mother liquor obtained therein be purified by recycling it to the process prior to the separation of ferric iron as set forth therein.

4. The method of making copper sulphate as set forth in claim 1, with the added step that a portion of the mother liquor obtained therein be treated with a soluble sulphide under acidified conditions to precipitate the copper resident therein as copper sulphide, said precipitate being re-cycled to the roasting step while the soluble ingredients are discarded from the operation.

5. The method of making copper sulphate from an argentiferous and auriferous copper-iron sulphide which comprises; commingling the comminuted minerals with a recycled, powdered copper matte, obtained at a later stage of the operation, and with a portion of such admixture previously roasted; roasting said mixture at a low red heat to produce optimum development of sulphates; scrubbing the roast gases with water and commingling said scrubbing medium with that portion of the calcines that has not been re-cycled; separating the insoluble from the soluble ingredients of said mixture purifying the resultant copper sulphate solution and crystallizing the resident copper sulphate; smelting the insoluble portion of the calcines for slag, matte and copper bullion; re-cycling the matte to the previously described roasting step; stripping the bullion by fusion with sulphur containing material to produce an enriched bullion, the slag and matte thus produced being re-cycled to the preceding smelting step.

6. The method of making copper sulphate set forth in claim 5, with the added step that purification from ferric iron be accomplished by aeration in the presence of a basic calcium compound.

ALFRED M. THOMSEN.

References Cited in the file of this patent

UNITED STATES PATENTS

| Number | Name | Date |
|---|---|---|
| 35,509 | Dahne | June 10, 1862 |
| 484,021 | Iles | Oct. 11, 1892 |
| 634,751 | Hofmann | Oct. 10, 1899 |
| 1,154,602 | Best | Sept. 28, 1915 |
| 1,542,935 | Greenawalt | June 23, 1925 |
| 1,634,497 | Greenawalt | July 5, 1927 |
| 2,425,760 | Sproule et al. | Aug. 19, 1947 |